United States Patent [19]

Matousek et al.

[11] Patent Number: 5,085,616
[45] Date of Patent: Feb. 4, 1992

[54] CLEANING SYSTEM FOR A COMBINE

[75] Inventors: Robert A. Matousek, Minooka; Jon E. Ricketts, Viola, both of Ill.

[73] Assignee: Case Corporation, Racine, Wis.

[21] Appl. No.: 654,740

[22] Filed: Feb. 13, 1991

[51] Int. Cl.⁵ .......................................... A01F 12/44
[52] U.S. Cl. ............................... 460/10; 209/394; 460/101
[58] Field of Search .............. 460/8, 9, 10, 99, 100, 460/101, 902; 209/394, 396, 254, 319

[56] References Cited

U.S. PATENT DOCUMENTS

| | | | |
|---|---|---|---|
| 734,467 | 7/1903 | Martien | 209/394 |
| 925,623 | 6/1909 | Cloz | 209/394 |
| 2,011,365 | 8/1935 | Kuballe | 209/394 |
| 2,058,381 | 10/1936 | Lindgren | 209/394 |
| 2,554,416 | 5/1951 | Morrissey | 209/394 |
| 3,092,116 | 6/1963 | Stroburg et al. | 460/8 |
| 3,334,744 | 8/1967 | James et al. | 209/394 |
| 3,367,496 | 2/1968 | Cockle et al. | 460/9 X |
| 3,412,735 | 11/1968 | Bichel et al. | 460/10 |
| 3,497,229 | 2/1970 | Sietmann et al. | 460/8 X |
| 4,008,722 | 2/1977 | Jakobi | 460/8 |
| 4,502,493 | 3/1985 | Jones et al. | 460/101 |
| 4,511,466 | 4/1985 | Jones et al. | 460/101 X |
| 4,561,972 | 12/1985 | Alm | 460/90 X |
| 4,573,483 | 3/1986 | Raineri | 460/8 |
| 4,677,991 | 7/1987 | Harris et al. | 460/8 |
| 4,897,071 | 1/1990 | Desnijder et al. | 460/10 |

*Primary Examiner*—Stephen J. Novosad
*Attorney, Agent, or Firm*—Dressler, Goldsmith, Shore, Sutker & Milnamow, Ltd.

[57] ABSTRACT

A cleaning system for a combine including a fan and reciprocal sieves mounted within a housing of the combine. The sieves include a series of transversely extending slats which are selectively adjustable to allow clean grain to pass therethrough. A plurality of transversely adjacent baffles extend in a fore-and-aft direction along substantially the entire length of and for a relatively short distance above an upper distance of the sieves. The baffles have a cumulative effect of inhibiting a disproportionate granular accumulation of granular material adjacent the downhill side of the sieves when the harvesting apparatus is tilted during slope harvesting. Each of the baffles are movable conjointly with and in response to adjustment of the slats of the sieves.

8 Claims, 3 Drawing Sheets

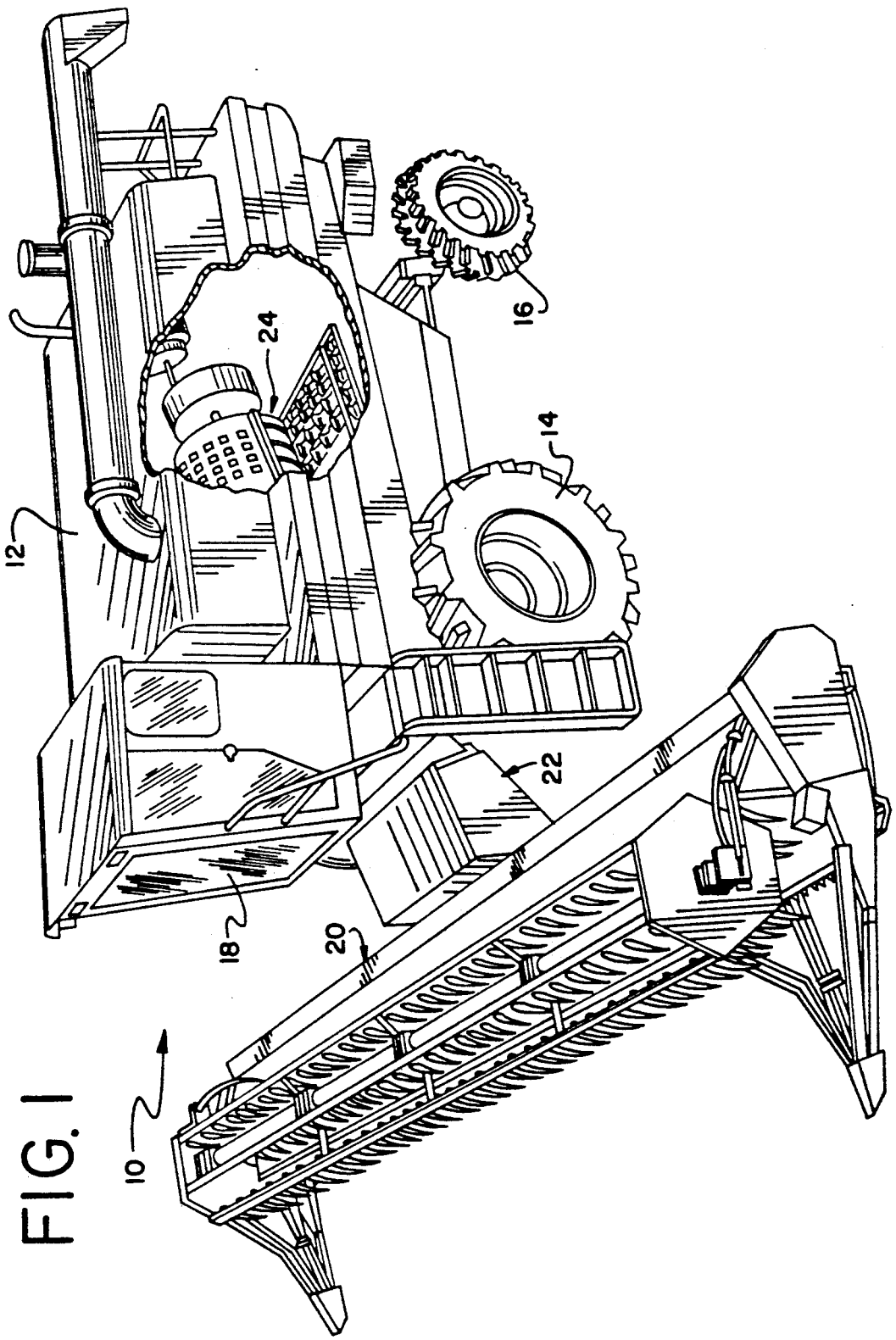

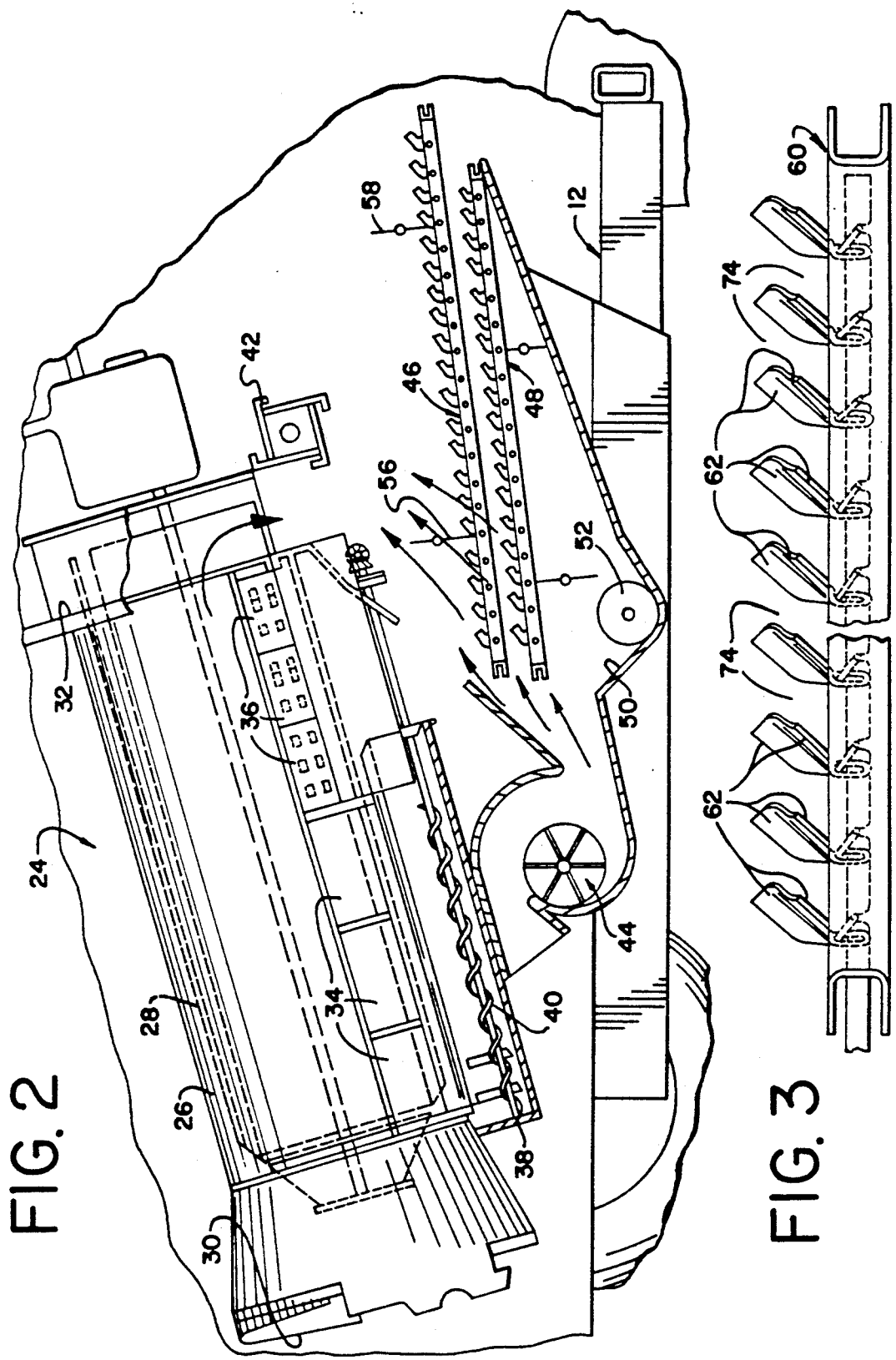

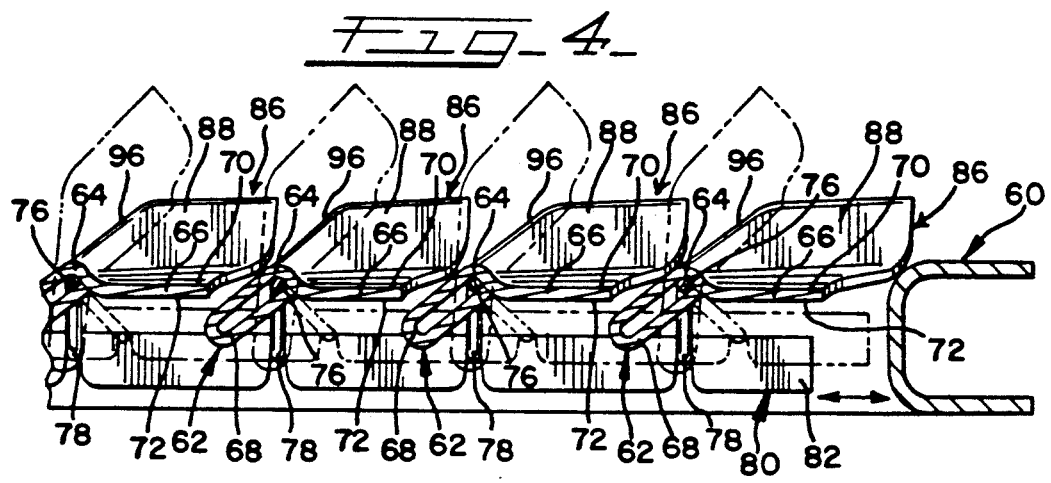
FIG_4
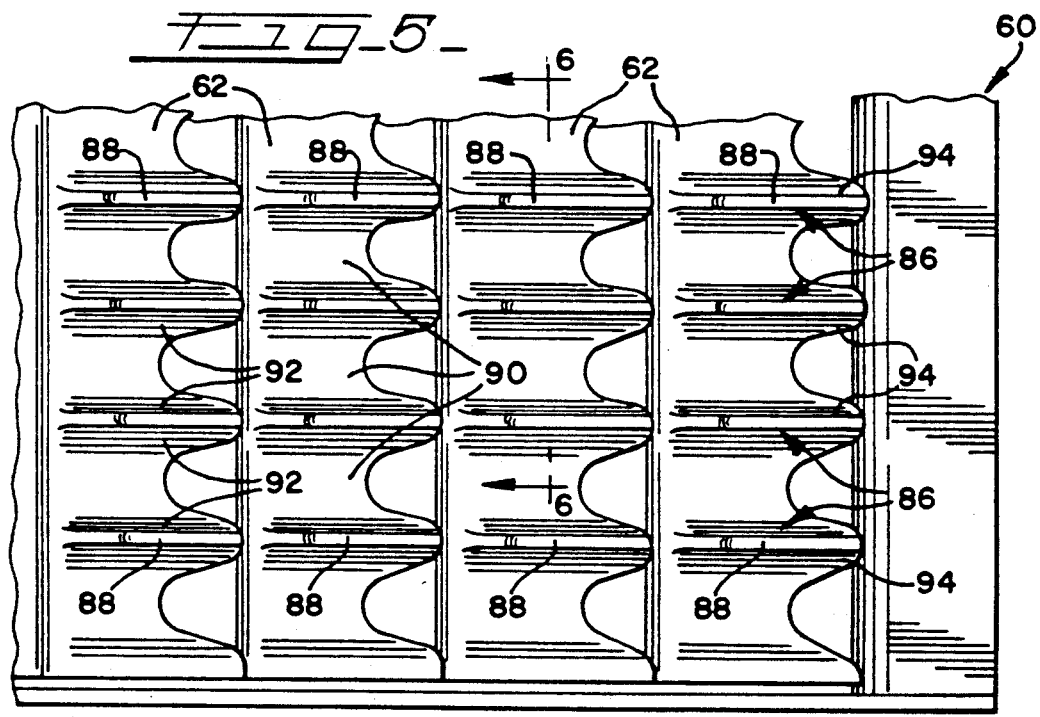
FIG_5
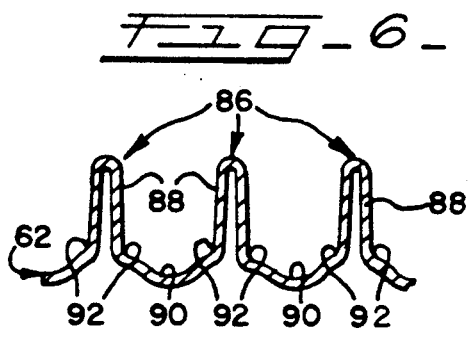
FIG_6
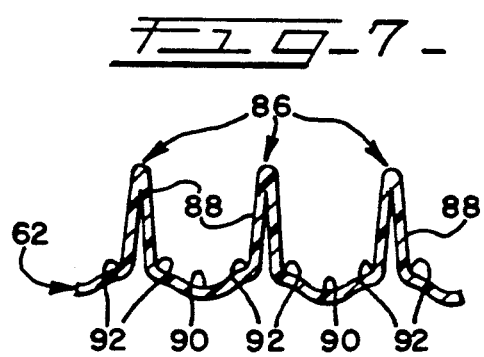
FIG_7

CLEANING SYSTEM FOR A COMBINE

FIELD OF THE INVENTION

The present invention generally relates to combines and, more particularly, to an improved cleaning system which facilitates the distribution of grain and material other than grain over a broadened cleaning area when the combine is tilted during slope harvesting.

BACKGROUND OF THE INVENTION

Combines are well known in the art. They are available in various designs and models to perform the basic functioning of harvesting, threshing, and cleaning of grain. As used herein, the term "grain" is meant to include corn, wheat, rye, oats, barley, flax seed, sorghum, soy beans, mixed grain, and any other food grains, feed grains, and oil seeds.

A typical combine includes a crop harvesting apparatus which reaps planted grain stalks An infeed mechanism arranged at a forward end of the combine operates in combination with the harvesting apparatus and feeds the grain stalks through a separating apparatus. The separating apparatus threshes and separates the grain from material other than grain.

While the separating apparatus acts to separate a substantial portion of the crop or grain from material other than grain, some chaff and/or straw remains intermixed with the grain and a further cleaning or separating action is normally required. Further separation is normally achieved in a cleaning section of the combine.

The cleaning section of a conventional combine receives grain and other material expelled from the separating apparatus. A typical cleaning section includes two reciprocally mounted sieves and a fan which produces a flow of air directed toward the sieves. Reciprocation of the sieves facilitates arrangement of the grain and other materials into a crop layer or mat on top of the sieves. Each sieve preferably includes a series of adjacent louvers or slats. A series of openings or passages is defined between adjacent slats to grade the material by size such that smaller granular particles are allowed to fall through the openings but causing larger pieces of material such as straw, chaff, and the like to be moved rearwardly and off the sieves. The material moved off the sieves is returned to the separating apparatus for rethreshing.

Separation of the crop material is facilitated by a forced flow of air created by the fan and flowing upwardly through the passages between the slats on the sieves. The upwardly directed air creates a force which urges residue material including straw, chaff, and the like to float on top of the sieves and into an airborne state such that it may be directed toward and expelled from a discharge end of the combine. The heavier seeds or clean grain tend to move to the sieve and fall through the openings or passages into a clean grain collector.

As long as the combine is operated on a generally level ground contour, heretofore known cleaning systems offer an efficient and effective separation of the crop material. Operational efficiency is adversely affected, however, when the combine or harvester is operated on a lateral incline or hillside. When a combine is operated on a hillside, there is a substantial loss of grain because the crop material received from the separating apparatus moves to the downhill side of the sieves. The crop materials build up to such a depth that the separating or cleaning function is substantially impaired or crop material spills over the downhill side of the cleaning sieves.

Conventional cleaning sieves have no means of maintaining an even layer or mat of crop material over the cleaning surface thereof. Thus, when the combine is operated on the hillside, crop material wants to move downhill with operation or reciprocation of the sieves. The crop material builds up or banks along the lower edge of the sieves to such a depth that the air flow from the fan is unable to penetrate and separate the grain from material other than grain. As will be understood, the air tends to follow the path of least resistance and blows through an uphill side of the cleaning sieve whereat it is insufficient to separate the crop material. As a result, the crop material proceeds rearwardly and falls off the edge of the sieve and it is discharged from the rear end of the combine. Grain loss can be quite excessive in these conditions.

There are combines which are specifically designed to operate on hillsides. Such combines are typically provided with hydraulic leveling devices that permit the harvesting apparatus to remain tilted according to the hillside slope while the cab region and grain cleaning assembly are adjustably rotated about a fore-and-aft axis and remain fairly level. Thus, among other things, the crop material received onto the sieves for separation and cleaning is spread out fairly evenly such that the cleaning action can be carried out relatively efficiently. Such selectively tiltable, hydraulic leveling systems, however, are quite expensive and thus are financially beyond the reach of many who would perhaps seriously be in need of such features. Moreover, the majority of combines which are sold are the "level land" type which suffer the loss grain problems discussed in detail above when operated on a hillside.

Additional efforts have been made to devise attachments which would effectively prevent crop material from accumulating on one side or the other of the sieves. One such attempt involves the attachment of structural members or dividers which are transversely spaced apart and extend fore-and-aft along a portion of and above the sieves. During inclined combine operation, the crop material moves downwardly toward the divider and forms an increasingly deeper mat which extends up to level with the top surface of the divider. As material depth exceeds the height of the divider, it flows thereover and moves further downhill. As will be appreciated, the crop material mat is quite deep near the divider while very little crop material is distributed over an uphill portion of the cleaning sieves.

Thus, there is a need and a desire for a cleaning system which facilitates distribution of grain and material other than grain over a broad cleaning area when the combine is tilted during slope harvesting.

SUMMARY OF THE INVENTION

In view of the above, and in accordance with the present invention, there is provided an improved cleaning system which facilitates distribution of grain and materials other than grain over a cleaning area of a combine in a fairly even manner thereby enhancing cleaning system efficiency when the combine is tilted during slope harvesting. The cleaning system includes a fan and at least one reciprocally mounted cleaning sieve for separating grain from material other than grain. The cleaning sieve includes a series of transversely extending slats which are angularly adjustable to define a series of passages allowing grain to pass through the sieve. A plurality of transversely adjacent baffles extend in a fore-and-aft direction along substantially the entire length and for a relatively short distance above the upper surface of the cleaning sieve. The baffle means have a cumulative effect of inhibiting a disproportionate granular accumulation of grain and material other than grain adjacent the downhill side of the cleaning sieve when the harvesting apparatus is tilted during slope harvesting. Each of the baffles are movable conjointly with and in response to adjustment of the slats of the cleaning sieve.

In a preferred form of the invention, the majority of slats of the cleaning sieve are provided with a plurality of transversely spaced fin-like portions extending in normal relation to an upper surface of the slat. The fin-like portions of a given slat combine and are generally aligned in a fore-and-aft direction with corresponding fin-like portions on other slats to form the fore-and-aft extending baffles. The baffles define relatively shallow channels therebetween for receiving crop material from a separating apparatus of the combine and inhibit disproportionate granular accumulation of grain and material other than grain adjacent the downhill side of the sieve when the combine is tilted during slope harvesting.

In a preferred form of the invention, each of said slats has a corrugated cross-sectional configuration, and the fin-like portions project from crested portions on the slats. In a most preferred form of the invention, adjacent fin-like portions on the slats are transversely spaced apart by a distance measuring from about 0.750 inches to about 5.0 inches.

In the illustrated form of the invention, the slats define a series of fore-and-aft extending finger-like portions. The baffles extend above and in generally vertical alignment with each of the finger-like portions on the slats. In one form of the invention, the slats are fabricated from metal and the fin-like portions are integrally formed therewith. In another form of the invention, the slats are fabricated from a non-metal material, and the fin-like portions are molded integrally therewith.

As will be understood, the fin-like portions on the slats inhibit the crop material from moving toward the downhill side of the sieve. It also distributes crop material, which normally tends to disproportionately accumulate against the downhill side of the cleaning sieve, fairly evenly across the width thereof thereby maintaining an effective and efficient cleaning and separating action by the reciprocating sieve and its attendant flow of air therethrough. Notably, the baffles defined by the fin-like portions on the sieves do not interfere with adjustment of the slats since they move conjointly therewith.

Numerous other features and advantages of the present invention will become readily apparent from the following detailed description, the accompanying drawings, and the appended claims.

BRIEF DESCRIPTION OF THE DRAWINGS

FIG. 1 illustrates a perspective view, partially broken away, of a combine;

FIG. 2 is an enlarged partial cross-sectional side elevational view of a preferred separating apparatus and cleaning section of a combine;

FIG. 3 is a side elevational view of a cleaning sieve associated with the present invention;

FIG. 4 is an enlarged cross-sectional side elevational view of a cleaning sieve embodying principles of the present invention;

FIG. 5 is a fragmentary plan view of a cleaning sieve embodying principles of the present invention;

FIG. 6 is a cross-sectional view of one form of the invention taken along line 6—6 of FIG. 5; and FIG. 7 is a sectional view substantially similar to FIG. 6 but showing an alternative form of the invention.

DETAILED DESCRIPTION OF A PREFERRED EMBODIMENT

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout the several views, there is shown in FIG. 1 a self-propelled combine 10. The combine is preferably of the type marked by the assignee herein and sold under Model No. 1600. The combine 10 includes a body or housing 12 supported on front drive wheels 14 and steerable rear wheels 16. The combine is powered by an engine (not shown) and controlled from an operator station 18. A crop harvesting apparatus or header 20 and an infeed mechanism 22 are attached at a forward end of a combine. The infeed mechanism 22 feeds crop material to a separator apparatus 24 enclosed by housing 12.

In the illustrated embodiment and as shown in FIG. 2, the separating apparatus 24 is preferably a conventional axial-flow type and includes a threshing cage 26 and a rotor 28. It should be appreciated, however, that the principles of the present invention equally apply to combines having a separating apparatus other than the axial-flow type. As illustrated, the threshing cage 26 has a generally cylindrical and at least a partially foraminous configuration with the rotor 28 mounted for rotation therewithin. The rotor 28 is driven from the engine of the combine and directs crop material to be threshed from an inlet or upstream end 30 of the separating apparatus toward an exit or downstream end 32.

Between the upstream and downstream ends of the separating apparatus 24, crop material is threshed several times repeatedly, but gently, as it spirals around the single large diameter rotor 28 and passes through the threshing cage 26. In a conventional manner, suitable instrumentalities on the rotor 28 cooperate respectively with semi-cylindrical concaves 34 and semi-cylindrical grates 36 provided on the threshing cage 26 to thresh the crop material such that most of the grain will be separated and propelled downwardly through the concaves and grates. Most of the grain drops into a grain pan 38.

Grain is conveyed rearwardly from the pan by an auger mechanism 40 for subsequent cleaning and collection. Straw, tailings, and material other than grain is impelled rearwardly out of the discharge end 32 of the separating apparatus 24 where a rotary beater 42 throws the straw and material other than grain rearwardly from the combine.

The combine 10 further includes a cleaning system for cleaning chaff, straw, tailings, and other foreign matter from the clean grain. The cleaning system includes a cleaning fan 44, a chaffer sieve 46, a grain sieve 48, and a clean grain collector 50. A suitable auger mechanism 52 directs clean grain from the collector 50 into a hopper (not shown).

Cleaning fan 44 extends transversely across substantially the entire width of the combine 10. More specifically, the fan 44 is transversely mounted for rotation within the housing 12 beneath the separator apparatus and forward of the cleaning sieves 46 and 48 for producing a directed flow of air. The cleaning fan 44 is of a conventional design and creates an air flow upwardly and rearwardly through the cleaning sieves 46 and 48 to urge unwanted chaff and other residue in the threshed grain into an airborne state and toward the discharge end 32 of the separating apparatus.

The chaffer sieve 46 and grain sieve 48 are arranged in vertically spaced relation to each other and are substantially similar in construction to each other. Accordingly, and for purposes of succinctness and brevity, only chaffer sieve 46 will be discussed in detail with the understanding that grain sieve 48 is substantially similar thereto.

Each sieve is supported in the housing 12 beneath the separating apparatus for receiving and sifting threshed grain received from the separating apparatus 24. Each sieve is located in the housing 12 such that the flow of air from the fan 44 passes upwardly therethrough to urge residue in the threshed grain into an airborne state and toward the discharge end of the separating apparatus 24 and away from the sieve. As illustrated, each sieve is supported for fore-and-aft reciprocation and oscillation by a pair of arms 56 and 58. As will be appreciated, reciprocation of the sieve facilitates arrangement of the crop material over the entirety of the sieve and tends to separate the clean grain from chaff, straw, tailings, and other residue materials so that the clean grain gravitates toward and falls through the sieve.

As illustrated in FIGS. 3 and 4, each sieve includes a generally rectangular frame 60 with a series or plurality of transversely elongated louvers or slats 62 arranged in an adjacent relationship relative to each other. Turning to FIG. 4, each slat 62 has a central portion 64 with two leg portions 66 and 68 extending in angularly offset directions therefrom.

As illustrated, leg portion 66 of each slat 62 is provided with a major upper surface 70 and a major lower surface 72. A series of clean grain passages 74 (FIG. 3) is defined between confronting upper and lower surfaces of adjacent slats. The dimension of such passages can be adjusted by modulating the angular displacement of the slats 62 relative to each other.

A transversely elongated pivot rod 76 is connected to the central portion 64 of each slat and controls the angular disposition thereof. Opposite ends of the pivot rods 76 are conventionally mounted on or extend through the frame 60. Intermediate its ends, each pivot rod is provided with a U-shaped crank 78 which engages with a linearly displaceable adjustment mechanism 80 including an endwise movable slotted bar or member 82. As will be appreciated, endwise movement of the adjustable member 82 will result in rotational movement of the pivot rod 76 about its longitudinal axis and, thus, angular displacement of the slats. By this arrangement, the slats 62 can be adjusted to any position between fully closed (illustrated in solid lines in FIG. 4) and fully opened (illustrated in phantom lines in FIG. 4).

In accordance with the principles of the present invention, transversely adjacent baffle means, broadly denoted by reference numeral 86, are provided for inhibiting a disproportionate granular accumulation of chaff and grain particles adjacent the downhill side of the sieve when the combine harvesting apparatus is tilted during slope harvesting. Each baffle means 86 extends in a fore-and-aft direction along substantially the entire length and for a relatively short distance above the upper surface 70 of each slat 62 comprising the sieve.

In the illustrated embodiment, baffle means 86 is comprised of a series of transversely spaced fin-like projections 88 extending upwardly from and generally normal to the upper surface 70 of the slats 62. As will be appreciated, the fin-like portions 88 of a given slat combine with and are generally aligned in a fore-and-aft direction with corresponding fin-like portions 88 on other slats to define relatively shallow channels for receiving crop material from the separating apparatus 24 of the combine. The fin-like projections 88 have a cumulative effect of retarding transverse movement of crop material across the sieve thereby inhibiting a disproportionate granular accumulation adjacent a downhill side of the cleaning sieve.

As illustrated in FIGS. 5 and 6, each slat 62 is preferably fabricated from sheet metal and has an undulating or a corrugated cross-sectional configuration. The configuration of each slat 62 provides a lower groove portion 90 extending between raised and adjacent crest or ridge portions 92. As shown in FIG. 5, each slat 62 is further provided with fore-and-aft extending finger portions 94 which preferably extend from crest portions 92 of each slat 62 to facilitate the separation of grain from material other than grain.

In a preferred form of the invention, the fin-like projections 88 extend from each crest portion 92 defined on the slat 62. As such, the fin-like projections 88 are transversely spaced approximately 0.875 inches and in generally vertical alignment with each of the finger like portions 94. Alternatively, however, the fin-like projections can be transversely spaced on every other crest portion or with wider transverse spacing therebetween. In this regard, the fin-like projections 88 can be transversely spaced in the range of about 0.750 inches to about 5.50 inches. As illustrated in FIG. 4, a rear wall or section 96 on each projection 88 is configured to allow the slat 62 to assume a fully closed position if so desired.

In the illustrated embodiment of FIG. 7, each slat 62 is fabricated from a non-metallic material such as plastic or the like. In this embodiment, the fin-like portions 88 are molded integrally with the slat.

In operation, the harvesting apparatus 20 reaps the grain stalks as the combine is driven across the field. The infeed mechanism 22 delivers the crop material to the inlet end 30 of the separating apparatus 24. Cooperative instrumentalities on the separating apparatus 24 impel threshed grain from the separating apparatus into the grain pan 38 from whence the grain material moves onto the sieves 46 and 48. While the separating apparatus 24 acts to separate a substantial portion of the grain from material other than grain, some chaff, straw, tailings, and etc. may be directed out of the openings in the separating apparatus along with the grain, and a further cleaning or separating action is required.

In sidehill operations of the combine, the grain and material other than grain expelled from the separating apparatus is received by the reciprocating sieves 46 and 48. The baffle means 86 conjointly act to restrict transverse shifting of the crop material over the reciprocating sieves. Thus, the mat or crop layer is spread fairly evenly across the entire sieve area thereby maximizing the cleaning effect of air f owing from the fan 44. As will be appreciated, the baffle means 86 allows sidehill operation that is efficient as level operation while having no effect when the combine is operating on a level ground contour.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A cleaning system for a combine having a housing enclosing a separating apparatus capable of threshing grain from crop material, said cleaning system comprising:
fan means mounted in said housing for producing a flow of air; and
sieve means reciprocally mounted in said housing in crop receiving relation with said separating apparatus for separating grain which gravitates through said sieve means from material other than grain which remains behind, said sieve means including a series of adjustable and transversely extending slats which are arranged relative to each other to define a series of passages therebetween allowing grain to pass therethrough, the majority of slats being provided with a plurality of transversely spaced fin-like portions extending in normal relation to an upper surface of said slat, and wherein the fin-like portions of a given slat combine and are generally aligned in a fore-and-aft direction with corresponding fin-like portions on other slats to form fore-and-aft extending baffle means defining relatively shallow channels therebetween for receiving crop material from said separating apparatus and inhibiting a disproportionate granular accumulation of grain and material other than grain adjacent a downhill side of said sieve means when the combine is tilted during slope harvesting.

2. The cleaning system according to claim 1 wherein each of said slats has a corrugated cross sectional configuration and wherein said fin-like portions project from crested portions of said slats.

3. The cleaning system according to claim 1 wherein each of said slats is fabricated from metal and said fin-like portions are integrally formed therewithin.

4. The cleaning system according to claim 1 wherein each of said slats is fabricated from a nonmetal material and said fin-like portions are molded integrally therewith.

5. A cleaning system for a crop harvesting apparatus having an apparatus for separating chaff and grain from harvested crop material, said cleaning system comprising:
a foraminous crop material receiving and separating platform through which heavier grain particles may gravitate while lighter chaff particles may remain behind, said platform including a series of transversely extending and adjustable slats presenting an upper surface in confronting relation to said separating apparatus;
means for directing a stream of air through the platform for entraining separated chaff particles and carrying same toward a discharge area;
means for reciprocating said platform in a fore-and-aft direction to facilitate separation of the chaff and grain particles; and
a plurality of transversely adjacent baffle means extending in a fore-and-aft direction along substantially the entire length oand for a relatively short distance above the upper surcace of said platform, said baffle means having a cumulartive effect of inhibiting a disproportionate granular accumulation of chaff and grain particles adjacent a downhill side of said platform when the harvesting apparatus is tilted during slop harvesting, and wherein each of said baffle means are movable conjointly with and in response to adjustment of said slats of said platform.

6. The cleaning system according to claim 5 wherein each of said baffle means is comprised of a series of fin-like portions extending from and arranged relative to said slats such that a fin-like portion on one slat will be general fore-and-aft alignment with a corresponding fin-like portion on another slat.

7. The cleaning system according to claim 6 wherein adjacent fin-like portions on said slats are transversely spaced apart by a distance measuring from about 0.750 inches to about 5.00 inches.

8. The cleaning system according to claim 5 wherein each of said slats has a generally corrugated cross-sectional configuration and defines a series of fore-and-aft extending finger-like portions, and wherein said baffle means extend above in generally vertical alignment with each of said finger-like portions.

* * * * *